United States Patent [19]

Barcomb et al.

[11] Patent Number: 4,963,259
[45] Date of Patent: Oct. 16, 1990

[54] SLUDGE DEWATERING FILTER PRESS

[75] Inventors: Lyle B. Barcomb, North Syracuse; Lawrence El-Hindi, Syracuse, both of N.Y.

[73] Assignee: Filter Tech Inc., Manlius, N.Y.

[21] Appl. No.: 338,882

[22] Filed: Apr. 17, 1989

[51] Int. Cl.$^5$ ................................................ B30B 9/24
[52] U.S. Cl. ..................................... 210/386; 210/400; 210/401; 210/DIG. 3; 100/120
[58] Field of Search .................. 210/400, 386, DIG. 3, 210/401; 100/118–120, 151–153

[56] References Cited

U.S. PATENT DOCUMENTS

| | | | |
|---|---|---|---|
| 3,459,122 | 8/1969 | Pastoors et al. | 210/400 |
| 4,053,419 | 10/1977 | Pav | 100/120 |
| 4,142,971 | 3/1979 | Le Fur et al. | 210/386 |
| 4,297,215 | 10/1981 | Altmeyer et al. | 210/386 |

FOREIGN PATENT DOCUMENTS 0203637 12/1986 European Pat. Off. ............ 100/118

*Primary Examiner*—W. Gary Jones
*Assistant Examiner*—Matthew O. Savage
*Attorney, Agent, or Firm*—Charles S. McGuire

[57] ABSTRACT

A mechanical sludge dewatering system including a plurality of first rollers, one or more second rollers and a liquid-permeable, endless belt passing between the first and second rollers from an inlet to an outlet end. At least some of the rollers of the first set are tapered from their ends to a smaller diameter at the center, the amount of taper decreasing from the roller at the inlet end to that at the outlet end, the opposing one or more second rollers being of constant diameter. The sludge carried on the belt passes through the cavities defined by the tapered first rollers and the cylindrical second roller(s), which decrease in cross section from the inlet to the outlet end, thereby squeezing water from the sludge. The first rollers each have grooves around their periphery adjacent each end, and the belt carries a protruding strip along each side, the belt being laterally constrained by the strips riding in the grooves. In a first embodiment, the second roller comprises a single drum; in a second embodiment a second, endless, liquid-impermeable belt is superposed with the liquid-permeable belt; in a third embodiment the single drum is replaced by a plurality of cylindrical rollers arranged in opposed relation with corresponding ones of the first rollers.

10 Claims, 5 Drawing Sheets

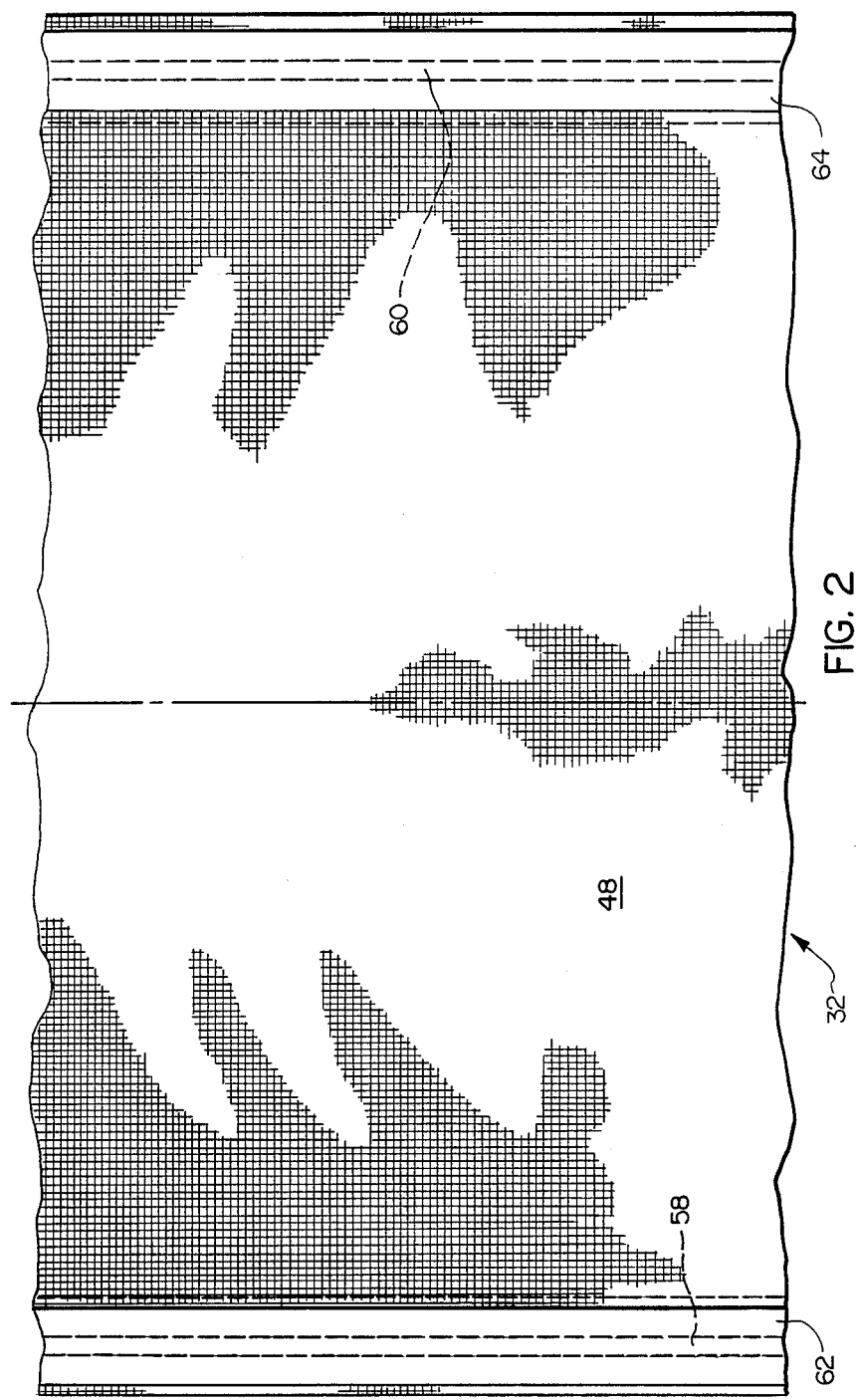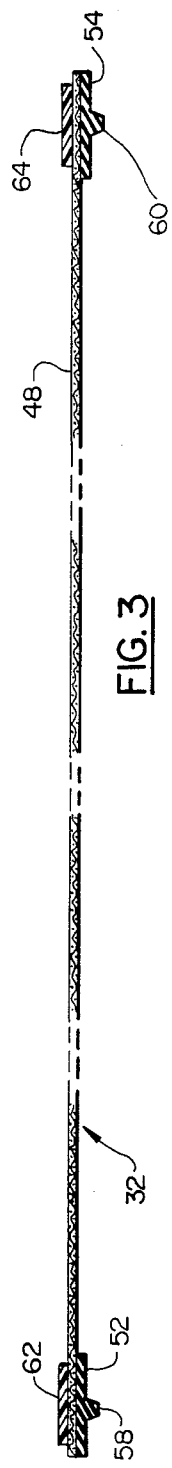

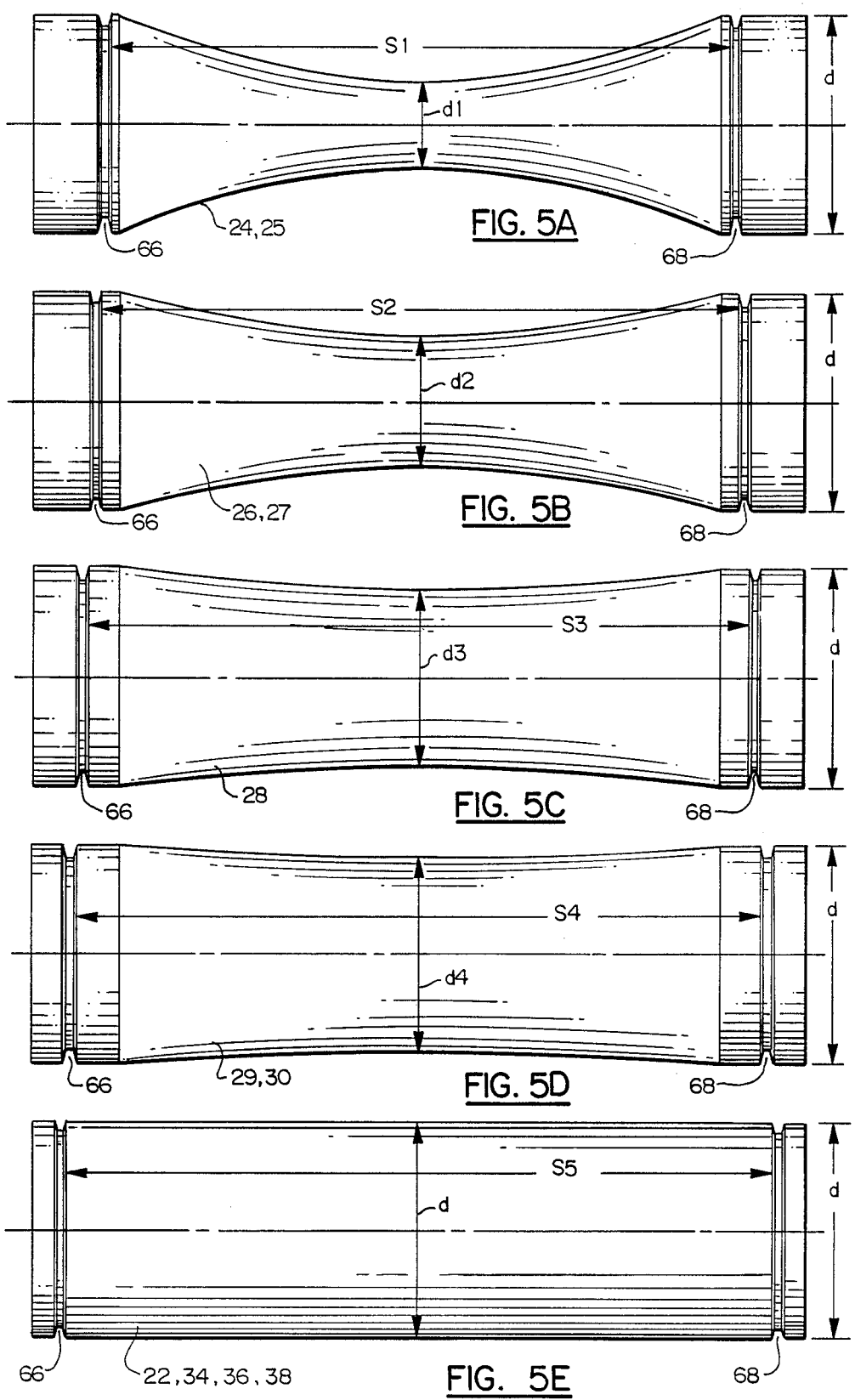

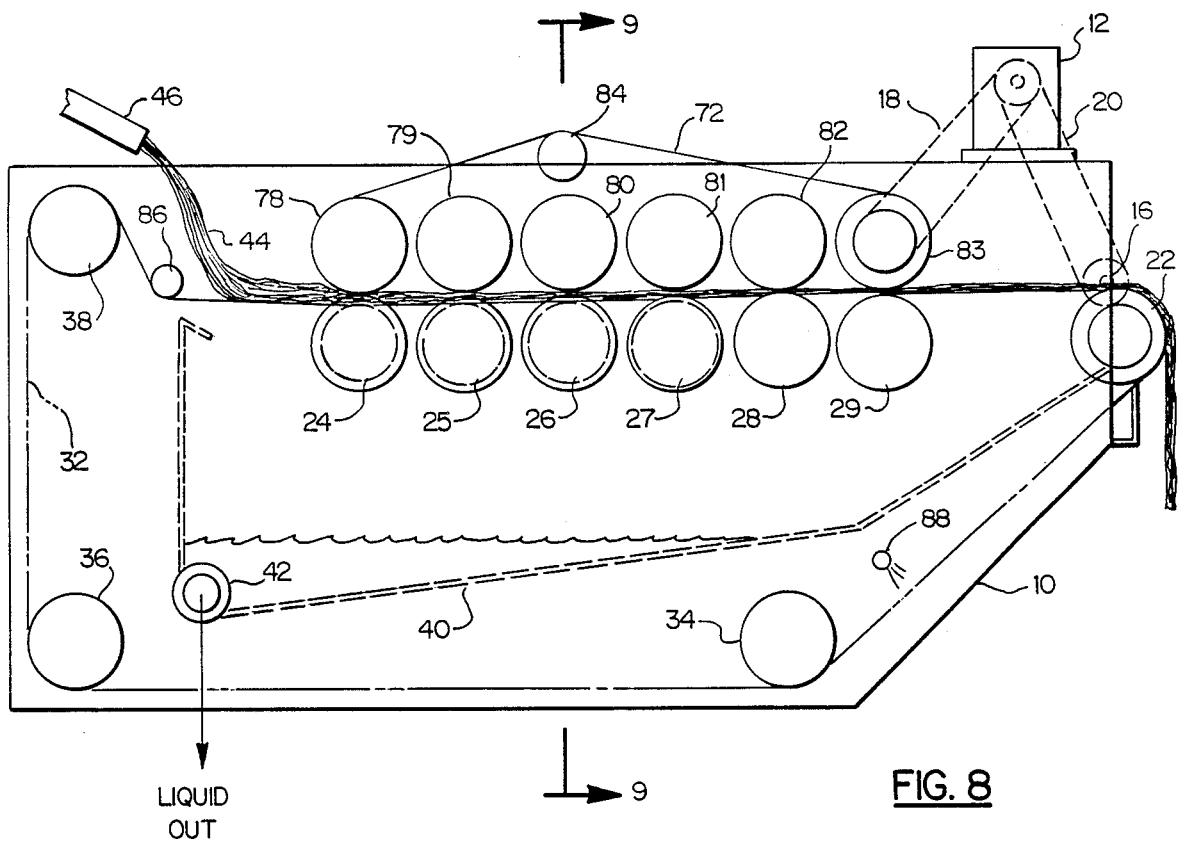
FIG. 8
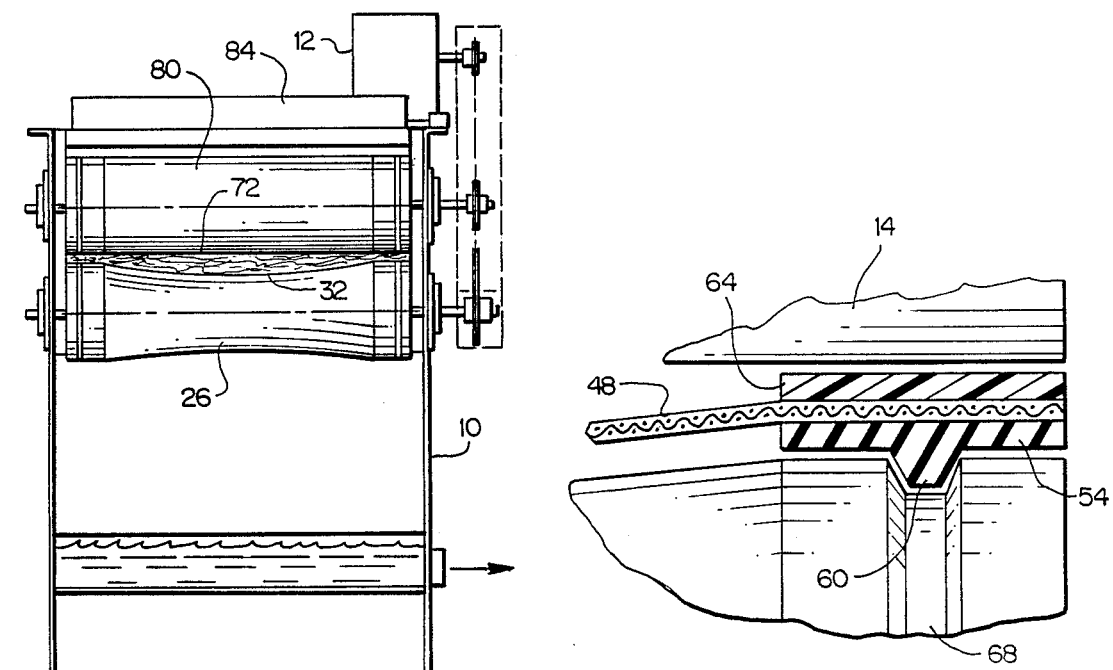
FIG. 9
FIG. 10

SLUDGE DEWATERING FILTER PRESS

BACKGROUND OF THE INVENTION

The present invention relates to mechanical filter presses for extracting water from industrial or municipal sludges and, more specifically, to a continuous-process sludge dewatering system including means for moving the sludge through a succession of cavities of decreasing cross section.

Sludges, as the term is used herein, are mixtures of one or more liquids and solids wherein the liquid is entrapped, sometimes being molecularly bound to the solids, and is difficult to remove by conventional means. Gravity settling is time consuming and often only marginally effective. Some sludges may be separable into solid and liquid phases by chemical treatment, or by freezing and thawing, but such treatment is often expensive and depends highly upon the chemical composition of the sludge being treated. Air-drying is ineffective since a crust forms at the surface, inhibiting further evaporation, and drying by application of non-solar heat is economically unfeasible.

Disposal of water-laden sludges presents both economic and environmental problems of ever-increasing magnitude. Since it is not uncommon for sludge to have a liquid content in excess of 90%, the disposal of separated phases is vastly simpler than that of untreated sludge. In many cases, one or both of the liquid and solid phases may be recycled or otherwise usefully employed after separation. Thus, there remains a need for sludge dewatering means which are both efficient in operation and economically justifiable, and it is the principal object of the present invention to provide such a system.

More specifically, the object of the invention is to provide a continuous-process sludge dewatering system employing a mechanical press wherein the sludge is passed through a succession of cavities of sequentially reduced cross section as liquid is removed.

Other objects will in part be obvious and will in part appear hereinafter.

SUMMARY OF THE INVENTION

In accordance with the foregoing objects, the invention is embodied in a system including an endless, flexible, liquid-permeable belt which passes between a plurality of rollers and a flat surface, from an inlet to an outlet end. The rollers are of the same diameter at each end and taper from the ends to an increasingly smaller diameter, being smallest at the center. The amount of taper, and thus the center diameter, of at least some of the rollers varies from one roller to the next, the first roller (at the inlet end) having the greatest amount of taper, i.e., the smallest center diameter, and the last roller (at the outlet end) having the least amount of taper.

In a first disclosed embodiment, the flat surface is provided by a drum rotatable on an axis parallel to those of the rollers, which are arranged along a lower part of the drum periphery. Sludge is deposited in a continuous manner upon the belt as it enters the inlet end, passing between the surface of the drum, which is contacted by the sludge, and the first roller, which is contacted by the belt. Due to its flexibility and the presence of the sludge, the belt conforms laterally to the tapered surface of the first roller, and some of the liquid is squeezed from the sludge as it passes through the cavity formed by the opposed surfaces of the drum and the first roller. The water passes through the belt, into a tank below, from which it is pumped or drained by gravity for further handling or processing in any way desired.

The cavity formed by the drum surface and successive rollers are progressively smaller, whereby additional liquid is squeezed from the sludge by passing through the smaller cavities. The predominantly solid material on the belt at the outlet end is removed by gravity, with the assistance of a doctor blade, if desired, as the endless belt travels around guide rollers back to the inlet end.

The belt is laterally constrained by a strip of material, which may be integrally formed with the belt, extending around the entire periphery thereof adjacent each lateral edge on the surface facing the rollers. Grooves of V-shaped or other cross-section corresponding to that of the belt strips are formed about the peripheries of the rollers, adjacent each end. The belt strips ride in the roller grooves, which are laterally spaced by progressively greater distances from the inlet to the outlet end to accommodate the difference in spacing of the belt strips due to the successively smaller amount of taper in the rollers. Continuous, flat strips of semi-elastic material are adhered to lateral edge portions of the surface of the belt facing the drum to inhibit the sludge from being squeezed out the sides. Both the belt and the drum are power driven at the same speed, which is variable to suit the type and relative liquid content of the sludge being processed, while the rollers are all idlers.

In a second disclosed embodiment, the sludge is deposited between the liquid-permeable belt, which travels over the surfaces of the progressively tapered rollers as previously described, and a second, impermeable, continuous belt which travels over the drum surface. A third disclosed embodiment includes the same, progressively tapered rollers and the permeable and impermeable belts as the second embodiment, but omits the drum, substituting therefor a plurality of cylindrical rollers corresponding in size and number to the tapered rollers and arranged in opposition thereto.

The foregoing and other features of the construction and operation of the sludge dewatering system of the invention will be more fully understood and appreciated from the following detailed description, taken in conjunction with the accompanying drawings.

BRIEF DESCRIPTION OF THE DRAWINGS

FIG. 2 is a fragmentary, plan view of an element of the apparatus of FIG. 1;

FIG. 3 is a front elevational view of the element of FIG. 2, in section on the line 3—3 thereof;

FIGS. 5a–5e are front elevational views of exemplary forms of a series of roller elements shown in side elevation in FIG. 1;

FIG. 8 is a diagrammatic, side elevational view of a third embodiment of the invention;

FIG. 9 is a front elevational view of the apparatus of FIG. 8, in section on the line 9—9 thereof; and FIG. 10 is an enlarged, fragmentary, front elevational view of a portion of the apparatus, applicable to all embodiments, showing a particular aspect thereof in greater detail.

DETAILED DESCRIPTION

Figure 1:
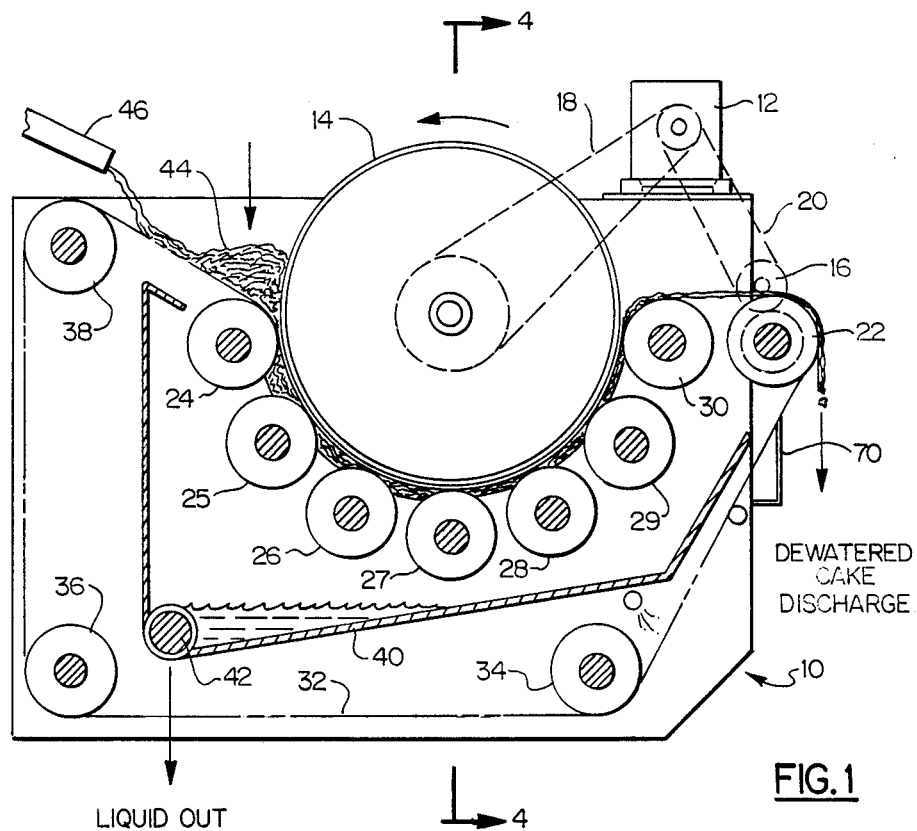
FIG. 1 is a diagrammatic, side elevational view illustrating the structure and operation of the invention, in a first embodiment.
Figure 4:
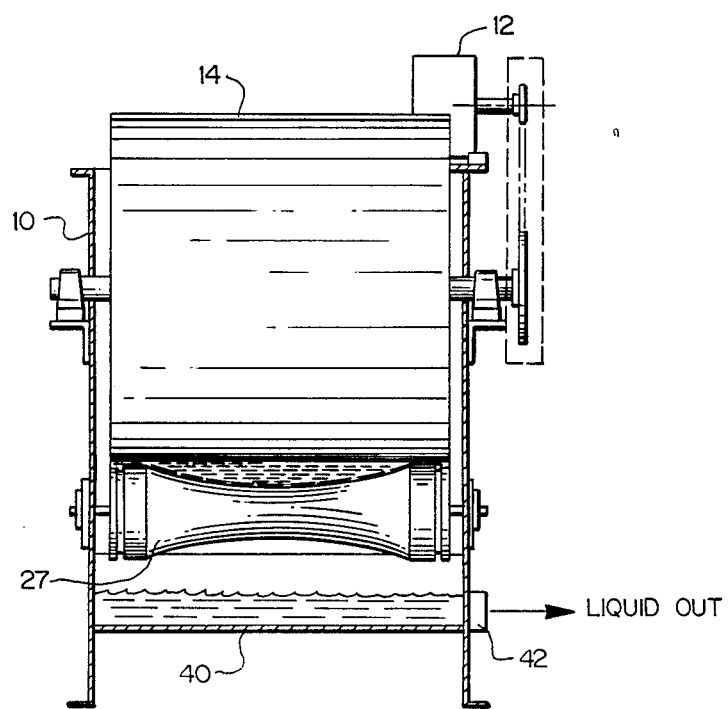
FIG. 4 is a front elevational view of the apparatus of FIG. 1, in section on the line 4—4 thereof.

Referring now to the drawings, in FIG. 1 is shown a first embodiment of the apparatus of the invention in somewhat diagrammatic form, including an outer framework 10 upon which other elements are supported. Variable speed drive motor 12 and drum 14 are fixedly and rotatably mounted, respectively, on frame 10. Motor 12 is connected to drum 14 and gear 16 by drive belts 18 and 20, respectively, gear 16 being operative to drive roller 22. A series of idler rollers, consecutively numbered 24–30 and described later in more detail, are rotatably mounted upon frame 10 with their axes of rotation parallel to that of drum 14.

Endless belt 32, of a flexible material and liquid-pervious construction, as also described in more detail later herein, passes between drum 14 and rollers 24–30, and over roller 22, as well as rollers 34, 36 and 38. Liquid collection tank 40 is supported by frame 10 below rollers 24–30 and includes drain outlet 42 in a lower part thereof. A supply of water-laden sludge 44 is deposited at a controlled rate through pipe or trough 46 onto the upper surface of belt 32 at a point prior to its entry between drum 14 and roller 24.

Belt 32, as seen in FIGS. 2 and 3, comprises a layer 48 of sturdy, yet flexible, water-permeable material such as a fine mesh screen. Strips 52 and 54, having protrusions 58 and 60 of predetermined cross section, are affixed to the surface of belt 32 which faces rollers 24–30 adjacent the side edges thereof about the entire periphery of the belt. Strips 62 and 64 of somewhat compressible material are affixed to the surface of layer 48 which faces drum 14 adjacent the side edges of the belt.

Referring now to FIGS. 5a–5e, examples of the outer configurations of rollers 22, 24–30, 34, 36 and 38 are shown. Each of the rollers are of equal diameter d at both ends, wherein grooves 66 and 68, of cross section corresponding to that of strips 58 and 60, are formed. The rollers of FIGS. 5a–5d taper from positions inwardly adjacent grooves 66 and 68 to diameters smaller than d, being of smallest diameter at the center. The diameters at the center of the rollers shown in 5a–5d are indicated as d1, d2, d3 and d4, respectively, the roller shown in FIG. 5e being of constant diameter, as is drum 14. Also, the spacing between grooves 66 and 68 increases sequentially from a minimum in the roller of FIG. 5a, indicated as s1, to a maximum in the roller of FIG. 5e, indicated as s5.

As belt 32 passes between rollers 24–30 with sludge 44 carried thereon, a cavity is formed between belt 32, which conforms to the surface configurations of rollers 24–30, and drum 14. The cross sectional area of this cavity decreases in accordance with the decreasing taper, i.e., with the increasing diameter at the center of the rollers of FIGS. 5a–5d. In the illustrated embodiment, the first two rollers at the sludge inlet end, i.e., rollers 24 and 25, are of the configuration of the roller of FIG. 5a, which is denoted by these reference numerals. The next two rollers 26 and 27 are of the configuration of the roller of FIG. 5b. Roller 28 is of the configuration shown in FIG. 5c, and the last two rollers 29 and 30 of the configuration of FIG. 5d. Rollers 22, 34, 36 and 38 are of the uniform diameter d of the roller of FIG. 5e.

Thus, as the sludge passes through the cavities formed between drum 14 and rollers 24 and 25, some of the liquid will be squeezed from the solids and will pass through belt 32 into tank 40. As the partially dewatered sludge then passes through the smaller cavities defined by rollers 26 and 27 additional liquid is removed. This is repeated as the sludge is forced through the even smaller cavity of roller 28 and the smallest cavities of rollers 29 and 30, at the outlet end. The sludge remaining on belt 32 at the outlet end, consisting predominantly of solids which can be handled and further processed as desired much more easily than the sludge in its original condition, is removed by gravity as the belt travels over roller 22, assisted by doctor blade 70, if desired. During the dewatering operation, the tight compression of the marginal edge portions 52 and 54 of belt 32 between drum 14 and the outer portions of rollers 24–30 compresses strips 62 and 64, effectively forming a seal to prevent the sludge from being forced out from the sides of the belt and rollers. Also, belt 32 is laterally constrained as it passes over the various rollers by protruding strips 58 and 60 riding in grooves 66 and 68, and the variation in spacing of the grooves compensates for the difference in spacing of the strips due to conformity of the belt to the contours of the rollers.

Figure 6:
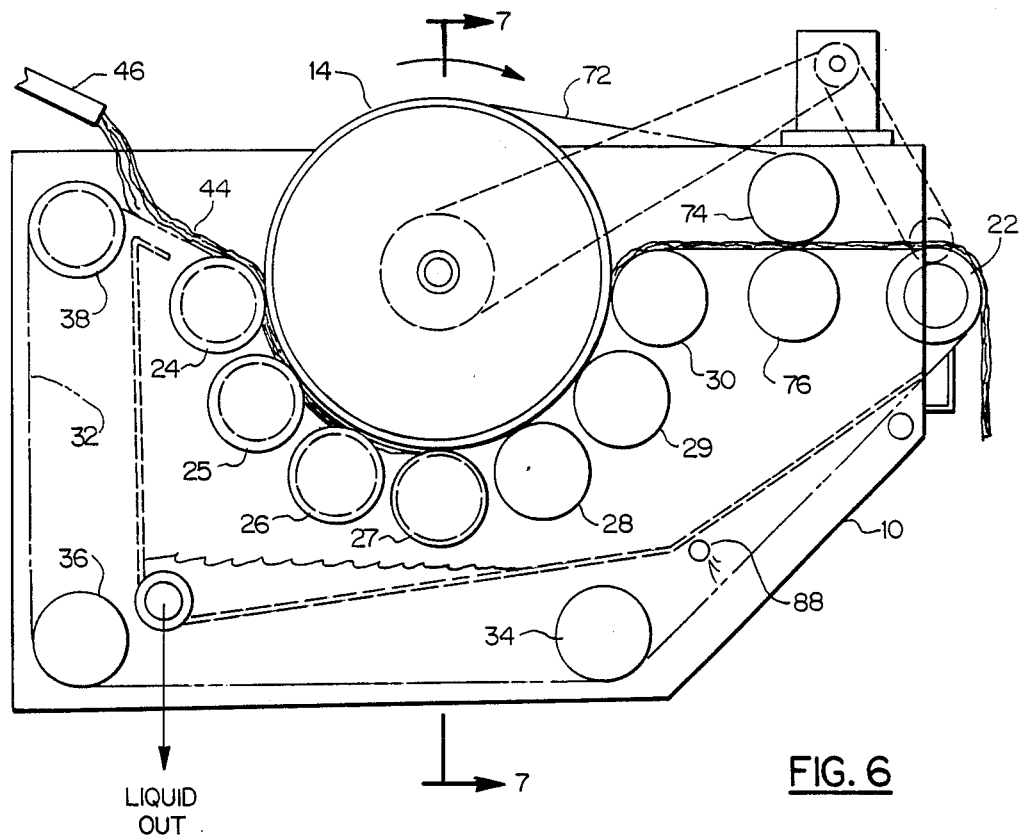
FIG. 6 is a diagrammatic, side elevational view of a second embodiment of the invention.
Figure 7:
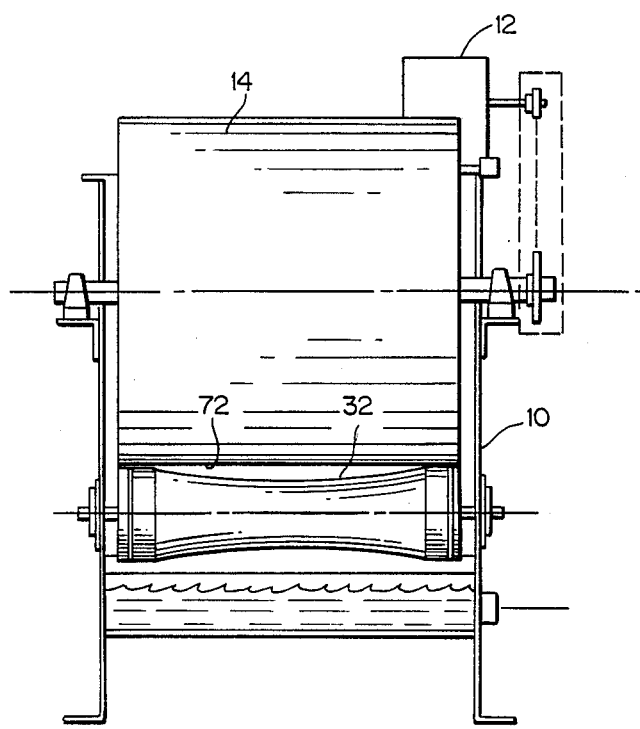
FIG. 7 is a front elevational view of the apparatus of FIG. 6, in section on the line 7—7 thereof.

Turning now to FIG. 6, the invention is shown in another embodiment, wherein elements common to the first embodiment are denoted by the same reference numerals. In this embodiment an additional, liquid impervious belt 72 passes around drum 14, and additional roller 74, which is opposed by a further additional roller 76. In this manner, the sludge is constrained between impervious belt 72 and pervious belt 32 as it passes through the cavities defined by the tapered rollers, removing the possibility of sludge sticking to the surface of drum 14. In all other respects, construction and operation of the embodiment of FIGS. 6 and 7 may be the same as in the previously described embodiment.

In the embodiment of FIGS. 8 and 9, drum 14 is eliminated and replaced by a series of cylindrical rollers, consecutively numbered 78–83, arranged parallel to and directly opposing tapered rollers 24–29. Impervious belt 72 passes between all of the opposed rollers and around roller 84, and liquid-pervious belt 32 is further guided by roller 86. Belt 18 drives roller 83, thus providing a drive for impervious belt 72 and thereby rollers 78–83, although in all embodiments, the drive means for drum 14 or roller 83 may be eliminated, if desired; in any case, all non-driven, rotatable elements act as idlers. Also, a backwash spray, provided by nozzle(s) 88, may be directed upon belt 32 in all embodiments to dislodge any sludge from screen 48.

The enlarged detail of FIG. 10 illustrates more clearly how the edge portions of the belt cooperate with the rollers and the drum or other rollers. Although the drum and roller are shown slightly spaced from the belt, it will be understood that in actual operation the marginal edges of the belt, including strips 54 and 64, will be tightly compressed between the drum and roller.

What is claimed is:

1. A mechanical, continuous-process sludge dewatering system comprising:
   (a) an endless, liquid-permeable belt;
   (b) first roller means including a plurality of individual rollers supported for rotation about spaced, parallel axes about which the respective external surfaces of said individual rollers are symmetrically arranged;

(c) second roller means comprising a single, cylindrical drum of constant diameter supported for rotation about an axis parallel to said axes of said first roller means;

(d) at least a predetermined group of said plurality of individual rollers having external surfaces which taper inwardly, toward the roller axis from equal diameters at each end to central portions of lesser diameter than said equal diameters, said lesser diameter being least for a first roller of said predetermined group and being greater for at least some successive rollers of said predetermined group, but not greater than said equal diameters, all of said equal diameters being smaller than said constant diameter of said drum;

(e) said liquid-permeable belt passing between said predetermined group of rollers and said second roller means wherein lateral edge portions of said belt are firmly engaged between opposing, external surfaces of each of said predetermined group of rollers and said second roller means;

(f) means for imparting rotation at a predetermined rate to said belt and to said first and second roller means; and (g) means for depositing water-laden sludge on an upper surface of said endless belt for passage therewith between said predetermined group of rollers and said second roller means, whereby said sludge is compressed to successively smaller volumes, thereby forcing water from said sludge and through said belt.

2. The sludge dewatering system of claim 1 wherein said predetermined group of rollers are successively arranged about a lower portion of the periphery of said drum.

3. The sludge dewatering system of claim 1 wherein said belt has a protruding strip and each of said plurality of rollers has a groove adjacent each side and about the periphery thereof, said strip being received in said groove as said belt moves over said plurality of rollers, thereby laterally constraining the position of said belt.

4. The sludge dewatering system of claim 3 wherein each of said plurality of rollers includes a portion adjacent both ends of said equal diameters wherein said grooves are formed, one of said strips protruding from the surface of said belt facing said plurality of rollers adjacent each side of said belt.

5. The sludge dewatering system of claim 4 wherein the lateral spacing between said grooves measured along the surface of each of said plurality of rollers, is substantially equal.

6. The sludge dewatering system of claim 1 and further including a second, endless belt of liquid impermeable material passing between said predetermined group of rollers and said second roller means in superposed relation to said liquid-permeable belt.

7. The sludge dewatering system of claim 6 wherein said liquid-impermeable belt passes completely around said second roller means.

8. A mechanical, continuous-process sludge dewatering system comprising:

(a) an endless, liquid-permeable belt;

(b) first roller means including a first plurality of individual rollers supported for rotation about spaced, parallel axes about which the respective external surfaces of said individual rollers are symmetrically arranged;

(c) second roller means comprising a second plurality of individual rollers, each of constant diameter and arranged in superposed relation to corresponding ones of said predetermined group of rollers, and each supported for rotation about an axis parallel to said axes of said first roller means;

(d) at least a predetermined group of said first plurality of individual rollers having external surfaces which taper inwardly, toward the roller axis from equal diameters at each end to central portions of lesser diameter than said equal diameters, said lesser diameter being least for a first roller of said predetermined group and being greater for at least some successive rollers of said predetermined group, but not greater than said equal diameters;

(e) said liquid-permeable belt passing between said predetermined group of rollers and said second plurality of individual rollers wherein lateral edge portions of said belt are firmly engaged between opposing, external surfaces of each of said predetermined group of rollers and said second plurality of individual rollers;

(f) means for imparting rotation at a predetermined rate to said belt and to said first and second roller means; and (g) means for depositing water-laden sludge on an upper surface of said endless belt for passage therewith between said predetermined group of rollers and said second roller means, whereby said sludge is compressed to successively smaller volumes, thereby forcing water from said sludge and through said belt.

9. The sludge dewatering system of claim 8 wherein said means for imparting rotation comprises a variable speed motor.

10. The sludge dewatering system of claim 9 and further including means linking said motor to said belt and to said second roller means for imparting driving rotation thereto, said first roller means operating as idlers.

* * * * *